United States Patent [19]

Maxey, deceased et al.

[11] 4,391,318
[45] Jul. 5, 1983

[54] COMPOSITE OF RUBBER AND METAL REINFORCEMENT THEREFOR

[75] Inventors: Frank S. Maxey, deceased, late of Uniontown, Ohio, by Gertrude Maxey, legal representative; Syed K. Mowdood, Akron, Ohio

[73] Assignee: The Goodyear Tire & Rubber Company, Akron, Ohio

[21] Appl. No.: 262,163

[22] Filed: May 11, 1981

[51] Int. Cl.$^3$ ............................ B60C 1/00; B32B 25/02
[52] U.S. Cl. ................................ 152/359; 152/330 R; 156/110 A; 156/110 C; 156/124; 156/307.5; 156/307.7; 156/331.5; 428/465; 428/475.8; 428/476.3; 428/492; 428/379; 428/625
[58] Field of Search ................ 156/110 A, 110 C, 124, 156/307.7, 307.5, 331.5, 334–335; 152/359, 356, 330 R; 428/323, 328, 402, 465, 475.8, 476.2, 492

[56] References Cited

U.S. PATENT DOCUMENTS 3,051,594  8/1962  Aitken et al. .................... 156/307.5
3,718,587  2/1973  Bhakuni et al. .................. 156/307.5
3,894,903  7/1975  Brooks et al. .................... 156/307.7
4,300,957 11/1981  Marencak et al. ................ 156/124

FOREIGN PATENT DOCUMENTS 1338930 11/1973  United Kingdom .

Primary Examiner—Edward C. Kimlin
Assistant Examiner—Lois E. Boland
Attorney, Agent, or Firm—H. C. Young, Jr.

[57] ABSTRACT

Composite of rubber and metal reinforcement where the rubber contains a cyanuric acid derivative and optionally a borate. Cured composite is useful as component for rubber tires, industrial belts and hose.

17 Claims, No Drawings

4,391,318

COMPOSITE OF RUBBER AND METAL REINFORCEMENT THEREFOR

FIELD OF INVENTION

This invention relates to the adhesion of metal and/or, alternately, organic or inorganic fibers, to elastomers. The invention particularly relates to a composite of rubber and wire filament or cabled filaments in the form of a cord or fiber as reinforcement therefor. The invention further relates to a composite of sulfur cured rubber and tire cord, composed of at least one metallic-plated steel filament as reinforcement therefor, and particularly to a pneumatic or semi-pneumatic rubber tire containing such reinforcement. The invention additionally relates to rubber industrial power transmission belts, conveyor belts and to rubber hose containing such reinforcement.

BACKGROUND OF THE INVENTION

Adhesion of rubber to metal or organic or inorganic fibers has, for a long time, been the subject of considerable experimentation and research. Various solutions have been suggested and have provided various degrees of success. (See British Pat. No. 1,338,930).

For example, various physical configurations of cabled wire filaments have been used to enhance physical or mechanical adhesion to rubber. Also, the surface of wire filaments has been treated by various materials and methods to enhance adhesion to rubber. Further, various materials have been mixed with the rubber itself in an effort to increase its adhesion to a cord of cabled wire filaments or organic fiber filaments.

Such rubber-metal reinforced composites are often applicable to the construction of pneumatic tires, industrial belts and hose.

However, even with the extensive amount of work and suggested solutions, methods of enhancing adhesion of rubber to metal or, alternately, organic and inorganic fibers are still being sought.

DISCLOSURE AND PRACTICE OF THE INVENTION

In accordance with this invention, a composite of rubber composition containing zinc oxide, carbon black, optionally and/or mineral fillers such as, for example, clay and/or precipitated silica, cure accelerator, fatty acid and/or salt thereof such as, for example, stearic acid or zinc stearate, and filament reinforcement therefor is provided where said filament is selected from at least one of metal, organic and inorganic filaments, preferably metal filament, optionally a multiple of filaments cabled together to form a cord, characterized in that said rubber composition contains (A) from about 0.05 to about 8, preferably about 0.5 to about 2, parts by weight per 100 parts by weight of rubber (phr) of a compound selected from at least one of diallyl cyanurate, triallyl cyanurate, tris(2-hydroxyethyl)cyanurate, triphenyl cyanurate, diallyl isocyanurate, triallyl isocyanurate, and 4-ketobenz triazine and, optionally, (B) about 0.05 to about 10, preferably about 0.2 to about 1.5, phr of at least one borate as the product of (i) a metal selected from Group IA, IIA, IIB, IVA, IVB, and VIII of the Periodic Table of the Elements, and (ii) of an acid selected from the group consisting of boric, orthoboric, metaboric and polyboric acid.

The invention further relates to such composite in which the rubber composition is sulfur cured with said reinforcement.

For the borate, (B), usually sodium, potassium, lithium, barium or calcium salts of boric, orthoboric, metaboric or polyboric acid are preferred.

The combination of (A) and (B) has been observed to be particularly beneficial over the use of (A) by itself in rubber for its adhesion to the metal cords apparently because of their synergistic effect.

Although metal filaments are preferred, an example of inorganic filament is glass and examples of well-known organic filaments are those of rayon, polyester, nylon and aramid.

In the preferred embodiment, where the filament is a metal filament, it is considered that such filament is preferably steel or is a steel filament having a microscopically thin metallic coating thereon comprised primarily of brass and/or zinc.

It is to be appreciated that such metallic-coated steel filament can optionally also have a very thin polymer overcoat thereon of protective compound such as, for example, benzotriazole or similarly protective compound, particularly for protection of the metal for its metal coating against oxidation. In further accordance with this invention, a pneumatic and/or semi-pneumatic rubber tire is provided typically having a generally toroidal shape and comprised of a general construction containing a tread, spaced inextensible beads and sidewalls connecting said beads and tread and with a supporting carcass therefor, where said carcass is a metal filament-reinforced sulfur-cured rubber composite of this invention.

In addition, in accordance with this invention an industrial article of manufacture is provided selected from at least one of industrial conveyor belt, power transmission belt, hose and vehicular tank continuous track pads which are, at least in part, constructed of the metal filament-reinforced sulfur-vulcanized rubber composite of this invention.

It is understood that other conventional materials can be used in the compounding of the rubber which include antidegradants, tackifying resins, preferably of the nonreactive type, peptizers, fillers and/or pigments and processing oils. Although it is related herein that the various mineral fillers can be used, usually the carbon black is preferred.

For the compounding of the rubber and the preparation of the wire/rubber composite, the compounding materials are simply mixed together to form the compounded rubber and applied to the filament or cord thereof, usually in a form of a textile type fabric form, such as by calendering and the resulting composite built into a green tire, industrial belt or hose construction and the product simply molded and cured with the aid of pressure to form the article of manufacture. Generally, the rubber/metal composite is cured at a temperature in the range of about 50° C. to about 200° C.

Various rubbers can be used in the practice of this invention of which unsaturated types are preferred. Representative of such unsaturated rubbers are, for example, natural rubber, synthetic cis 1,4-polyisoprene, polychloroprene, cyclene rubbers, rubbery polymers of 1,3-polybutadiene, butadiene/styrene copolymers, isoprene/styrene copolymers, epichlorohydrin homo and copolymers, butadiene/acrylonitrile copolymers, EPDM rubbers, butyl rubbers, halobutyl rubbers, norbornene rubber, thiokol rubbers and blends thereof with a minor portion of block SBS or SIS (styrene and butadiene or isoprene) copolymers.

The wire cord itself in the practice of this invention can be composed of 1 to 50 (or more) filaments of steel wire twisted, or cabled together to form the cord. Therefore, the cord can be monofilament in nature although this is considered rare and at least four filaments are usually preferred. For example, for use in pneumatic rubber tires, cord for passenger tires might be composed of 3 to 6 cabled filaments, cord for truck tires 10 to 30 cabled filaments and cord for giant earthmover vehicle tires 40 to 50 cabled filaments.

It is generally preferred that the steel filaments themselves are individually coated, or plated, with transition metal or alloy thereof which are preferably microporous, often practically monomolecular representative of which are at least one of those selected from brass, zirconium, cerium, lanthanum, nickel, cobalt, tin, titanium, zinc, copper and bronze. Generally, an outer monomolecular, microporous layer of zinc is suitable over a very thin brass plate on the steel wire.

It is recognized that the steel wire can be plated or coated with the metal or metal alloy such as brass and/or transition metal or alloy by various methods to obtain a thin, preferably a practically monomolecular coat and usually somewhat microporous in nature. For example, electro deposition can be effected by passing the wire through a charged electrolyte bath.

It may also be feasible to use a vapor deposition technique to plate the wire.

The metal coating on the steel is generally microscopically porous, thereby understood to expose small areas of steel surface.

It is not reasonably practical to describe within rigid limits the metal plating on the steel wire. Optimum thicknesses and amounts can be a function of variables such as ratio of copper to zinc or other plating metals, nature of surface to be plated, alloy nature, mode of deposition, thickness of initial oxide layers, magnitude of residual stresses. The type and quality of plating and its thickness and subsequent adhesion of the rubber and metal will be affected by the reactivity of the rubber vulcanization system.

The steel wire can relate generally to what is known as carbon steel, also called ordinary steel, also called straight carbon steel or plain carbon steel, e.g., American Iron and Steel Institute Grade 1070 high carbon steel (AISI 1070). Such steel owes its properties chiefly to the presence of carbon without substantial amounts of other alloying elements. In this respect, see Metals Handbook, The American Society for Metals, Metals Park.

Brass generally and preferably relates to compositions in which the major component is alpha brass, i.e., which contain from about 62 to 75 percent copper and 38 to 25 percent zinc, respectively.

The cyanurate derivative and/or optional metal borate can be mixed with the rubber and its compounding ingredients by conventional procedures prior to application to the metal filament (wire) or organic or inorganic fibers.

As hereinbefore pointed out, the plated wire may contain a coating of protective material such as benzotriazole and the like prior to application of the compounded rubber. Such protective agent coatings are those which are believed to somewhat interact with copper in a brass coating on the steel wire to form a polymeric complex of agent plus copper and/or zinc.

This polymeric complex is insoluble in most solvents and serves as a protective barrier to environmental degradation of the underlying brass.

The practice of the present invention has been observed to result in improved aged rubber-metal adhesion, in many cases with improved initial, i.e., original adhesion of vulcanized brass-coated steel/rubber composites.

The practice of this invention is further illustrated by reference to the following example which is intended to be representative rather than restrictive of the scope of the invention. Unless otherwise indicated, all parts and percentages are by weight.

EXAMPLE I

A compounded rubber was prepared as a control by mixing in a suitable mixer, control compositions, (Control X) and (Control Y), as cis-1,4-polyisoprene (Control X) with various compounding ingredients which included the materials shown in the following Table 1.

TABLE 1

| Materials | Parts (Control X) | Parts (Control Y) |
|---|---|---|
| Cis-1,4-polyisoprene rubber | 100 | 100 |
| Stearic acid | 2 | 2 |
| Zinc oxide | 8 | 8 |
| Antidegradants | 0.75 | 1.5 |
| Carbon black | 60 | 65 |
| Sulfur | 4 | 5.2 |
| Cobalt carboxylate of organic acid (10–11% cobalt) | 3 | 1.75 |
| Tackifying resin/processing oil | 4 | 3.5 |
| Hexamethoxymethylmelamine/resorcinol | 4 | — |

The recipe for the Control X and Y compounded rubbers were modified as shown in Tables 2 and 3 and compounded rubber samples prepared thereby in experiments identified herein as experiments or examples A–L in Tables 2–5. Pull-out adhesion tests are generally of the TCAT type or an SBAT (ASTM method) type, optimally cured at 135° C.

TABLE 2

| Compounds added to Control X Recipe | Control X | Experiments (phr) | | | |
|---|---|---|---|---|---|
| | | A | B | C | D |
| Triphenyl Cyanurate | — | 3.75 | — | — | — |
| Triallyl Cyanurate | — | — | 1.87 | — | — |
| Triallyl-S—triazine-2,4,6-(1H, 3H,5H)trione | — | — | — | 1.87 | 0.93 |
| Adhesion Test: (SBAT) Pull Out Force in lbs. | | | | | |
| Original | 231 | 250 | 247 | 274 | 265 |
| Humid Aged (10 days/ 77° C./98° RH) (RH = relative humidity) | 140 | 183 | 244 | 193 | 216 |
| Oven Aged (7 days/121° C.) (Nitrogen Atmosphere) | 169 | 224 | — | 247 | 217 |

TABLE 3

| Compounds added to Control X Recipe | Control X | Experiments (phr) E |
|---|---|---|
| 75% Triallyl Cyanurate on a Microcel carrier | — | 1.0 |
| Adhesion Test: (TCAT) Pull Out Force in Newtons | | |
| Original | 629 | 543 |
| Hot Water Aged (10 days/H$_2$O/90° C.) | 427 | 656 |

TABLE 4

| Compounds added to Control Y Recipe | Control Y | F | G | H | I |
|---|---|---|---|---|---|
| Tris(2-hydroxyethyl) cyanurate | — | 3.77 | — | — | — |
| 4-keto benztriazine | — | — | 1.5 | — | — |
| Triallyl cyanurate | — | — | — | — | 1.9 |
| Triallyl-S—Triazine-2,4,6(1H,3H,5H)trione | — | — | — | 0.94 | — |
| Adhesion Test: SBAT Pull Out Force in Lbs. | | | | | |
| Original | 230 | 230 | 233 | 239 | 244 |
| Humid Aged (10 days/ 77° C./98% RH) | 157 | 163 | 174 | 153 | 233 |
| Salt Aged (48 hrs/ 5% NaCl in H$_2$O/90° C.) | 186 | 205 | 229 | 214 | — |
| Oven Aged (7 days/121° C.) (Nitrogen Atmosphere) | 170 | 198 | 190 | 210 | — |

TABLE 5

| Compounds added to Control Y Recipe | Control Y | J | K | L |
|---|---|---|---|---|
| Triallyl Cyanurate | — | 2.0 | — | — |
| 4-keto benztriazine | — | — | 0.94 | — |
| Sodium metaborate | — | — | 0.47 | — |
| 75% Triallyl Cyanurate on a Microcel carrier | — | — | — | 1.0 |
| Adhesion Test: (TCAT) Pull Out Force in Newtons | | | | |
| Original | 425 | — | 477 | 489 | 488 |
| Salt Aged (6 days/5% NaCl in H$_2$O/94° C.) | 380 | — | 431 | 547 | — |
| Hot Water Aged (14 days/ H$_2$O/90° C.) | 231 | (separate control) | — | — | 568 |

In this Example, the composites of rubber having filament reinforcement were tested with two types of pull-out adhesion tests, namely, the TCAT and SBAT types, optimally cured at 135° C.

The adhesion test referred to as SBAT, or Standard Block Adhesion Test, is generally set forth in ASTM test No. D2229-73.

The TCAT, or Tire Cord Adhesion Test, is also a pull-out adhesion test and its description can conveniently be more fully found in U.S. Pat. No. 4,095,465.

As a further example showing the special benefit of utilizing both a borate and cyanurate, experiments M and N will provide showing the advantage of adding to Control Y either zinc borate or sodium metaborate and triallyl cyanurate. The adhesion, both original and aged is measured using the TCAT test.

TABLE 6

| Compounds added to Control X Recipe | (Control Y) | Experiments (phr) M | N |
|---|---|---|---|
| Triallyl Cyanurate | — | 0.5 | 1.0 |
| Zinc Borate | — | 0.5 | — |
| Sodium Metaborate | — | — | 0.5 |
| TCAT Adhesion (pull out force in Newtons) | | | |
| I Original | 502 | 533 | 510 |
| II Aged: 10 days/ H$_2$O/90° C. | 404 | 633 | 542 |

While certain representative embodiments and details have been shown for the purpose of illustrating the invention, it will be apparent to those skilled in this art that various changes and modifications may be made therein without departing from the spirit or scope of the invention.

What is claimed is:

1. A composite of rubber composition containing zinc oxide, carbon black, optionally and/or mineral fillers, cure accelerator(s), fatty acid and/or metal salt thereof, and filament reinforcement therefor where said filament is selected from at least one of steel, organic and inorganic filaments, optionally as a multiple of filaments cabled together to form a cord, characterized in that (i) when said filament or cord thereof is steel, said rubber composition contains (A) about 0.05 to 8 phr of a compound selected from at least one of diallyl cyanurate, triallyl cyanurate, tris(2-hydroxyethyl) cyanurate, triphenyl cyanurate, diallyl isocyanurate, triallyl isocyanurate, and 4-ketobenz triazine and, optionally, (B) about 0.05 to about 10 phr of at least one borate as the product of (i) a metal selected from Groups IA, IIA, IIB, IVA, IVB, and VIII of the Periodic Table of the Elements, and (ii) an acid selected from the group consisting of boric, orthoboric, metaboric or polyboric acid; and when said filament or cord thereof is not steel the rubber composition contains both the (A) compound and the (B) borate.

2. The composite of claim 1 where said reinforcement is composed of at least one steel filament or cord of cabled filaments having a microscopically porous metal coating thereon composed primarily of brass and/or zinc.

3. The composite of claim 1 where said rubber composition contains (A) a compound selected from at least one of diallyl cyanurate, triallyl cyanurate, tris(2-hydroxyethyl) cyanurate, triphenyl cyanurate, diallyl isocyanurate, triallyl isocyanurate, and 4-ketobenz triazine and (B) a borate selected from at least one of sodium, potassium, lithium, barium and calcium salt of boric, orthoboric, metaboric or polyboric acid.

4. The composite of claim 1 where said filament is steel and has an outer, thin, practically monomolecular microporous metal coating thereon selected from at least one of zirconium, cerium, lanthanum, nickel, cobalt, tin, titanium, zinc, copper, brass and bronze plated on the steel wire.

5. The composite of claim 1 where the said filament reinforcement is steel and is brass coated with the brass coat itself having an outer coat of zinc.

6. The composite of claim 4 where said filament is carbon steel and coated with brass where the major component of said brass is alpha brass.

7. The composite of claim 3 where said wire filament has a protective overcoat of benzotriazole.

8. The composite of claim 2 or 3 where said rubber is selected from at least one of natural rubber, synthetic cis-1,4-polyisoprene, polychloroprene, cyclene rubbers, rubbery polymers derived from 1,3-butadiene, butadiene/styrene copolymers, isoprene/styrene copolymers, epichlorohydrin homo and copolymers, butadiene/acrylonitrile copolymers, EPDM rubbers, butyl rubbers, halobutyl rubbers, norbornene rubbers, thiokol rubbers, and blends thereof.

9. A pneumatic or semi-pneumatic rubber tire having a generally toroidal shape and comprised of a general construction containing a tread, spaced inextensible beads and sidewalls connecting said beads and tread and with a supporting carcass therefor, where said carcass is a filament cord-reinforced sulfur-cured rubber composite of claim 1 where said filament is steel.

10. The rubber tire of claim 9 where said cord is composed of about 2 to about 50 cabled metal-plated steel filaments, said filament composed of steel filament having a microscopically porous metal coating thereon composed primarily of brass and/or zinc.

11. The tire of claim 9 where said steel filament has an outer, thin, practically monomolecular microporous metal coating thereof selected from at least one of zirconium, cerium, lanthanum, nickel, cobalt, tin, titanium, zinc, copper, brass and bronze plated on the steel wire.

12. The tire of claim 9 where said steel filaments have an outer coating of brass and said brass itself has an outer coat of zinc.

13. The tire of claim 10 or 11 where said steel is carbon steel and the major component of said brass is alpha brass.

14. The tire of claims 10 or 11 where said wire filament has a protective overcoat of benzotriazole.

15. The tire of claim 9 or 10 where said rubber is selected from at least one of natural rubber, synthetic cis-1,4-polyisoprene, polychloroprene, cyclene rubbers, rubbery polymers derived from 1,3-butadiene, butadiene/styrene copolymers, isoprene/styrene copolymers, epichlorohydrin homo and copolymers, butadiene/acrylonitrile copolymers, EPDM rubbers, butyl rubbers, halobutyl rubbers, norbornene rubber, thiokol rubbers and blends thereof.

16. The tire of claim 9 or 10 where the borate of (B) is selected from at least one of zinc borate and sodium metaborate.

17. An industrial article of manufacture selected from at least one of industrial conveyor belt, power transmission belt and hose which are, at least in part, constructed of the metal cord-reinforced sulfur-vulcanized rubber composite of claim 1 or 2.

* * * * *